United States Patent
Young et al.

(10) Patent No.: US 12,533,209 B2
(45) Date of Patent: Jan. 27, 2026

(54) DENTAL HANDPIECE WITH EMBEDDED WIRELESS COMMUNICATION DEVICE

(71) Applicant: DentalEZ, Inc., Malvern, PA (US)

(72) Inventors: Robert Young, Bethlehem, PA (US); Doug Cahill, Lititz, PA (US); David Reagan, Conestoga, PA (US); Luther Gates, Gap, PA (US)

(73) Assignee: DENTALEZ, INC., Malvern, PA (US)

( * ) Notice: Subject to any disclaimer, the term of this patent is extended or adjusted under 35 U.S.C. 154(b) by 606 days.

(21) Appl. No.: 17/764,783

(22) PCT Filed: Aug. 31, 2020

(86) PCT No.: PCT/US2020/048753
§ 371 (c)(1),
(2) Date: Mar. 29, 2022

(87) PCT Pub. No.: WO2021/066978
PCT Pub. Date: Apr. 8, 2021

(65) Prior Publication Data
US 2022/0354616 A1 Nov. 10, 2022

Related U.S. Application Data

(60) Provisional application No. 62/907,981, filed on Sep. 30, 2019.

(51) Int. Cl.
*A61B 90/98* (2016.01)
*A61C 1/05* (2006.01)

(52) U.S. Cl.
CPC .............. *A61B 90/98* (2016.02); *A61C 1/052* (2013.01); *A61C 2204/005* (2013.01)

(58) Field of Classification Search
CPC ......... A61B 90/98; A61B 90/90; A61C 1/052; A61C 1/05; A61C 1/02; A61C 1/00; A61C 2204/005
(Continued)

(56) References Cited

U.S. PATENT DOCUMENTS

| 6,899,538 B2 | 5/2005 | Matoba |
| 7,092,605 B2 | 8/2006 | Adams et al. |
| (Continued) | | |

FOREIGN PATENT DOCUMENTS

| EP | 1962230 A1 | 8/2008 |
| EP | 1988491 A1 | 11/2008 |
| (Continued) | | |

OTHER PUBLICATIONS

Pernot et al., Elastic Belt-Shaped Device for Fixing a Dental Tool to a Handpiece Head, WO-2005063141-A1 (machine translation) (Year: 2005).*

(Continued)

*Primary Examiner* — Eric J Rosen
*Assistant Examiner* — Mirayda A Aponte
(74) *Attorney, Agent, or Firm* — Panitch Schwarze Belisario & Nadel LLP

(57) ABSTRACT

A dental handpiece includes a head portion supporting a turbine for a removable rotating dental tool, and a handle portion having an internal cavity. One or more conduits extend at least partially through the internal cavity toward the head portion. At least one of the conduits is a drive fluid tube delivering drive fluid to the head portion for rotating the turbine. A wireless communication device within the internal cavity is attached to at least one of the conduits. At least a section of the handle portion surrounding the wireless communication device is formed of a dielectric material. The wireless communication device is configured to wirelessly communicate with an external reader or writer and store data related to at identification, use, and/or maintenance of the handpiece. An electrically inert substrate material encapsulates the wireless communication device, which is electrically isolated from other components of the handpiece.

17 Claims, 4 Drawing Sheets

(58) Field of Classification Search
USPC .................................. 433/132, 103, 104
See application file for complete search history.

(56) References Cited

U.S. PATENT DOCUMENTS

| | | | |
|---|---|---|---|
| 7,473,097 B2 | 1/2009 | Raby et al. | |
| 7,630,791 B2 | 12/2009 | Nguyen et al. | |
| 7,837,694 B2 | 11/2010 | Tethrake et al. | |
| 8,118,594 B2 | 2/2012 | Pernot et al. | |
| 8,235,716 B2 | 8/2012 | Lemchen | |
| 8,613,617 B2 | 12/2013 | Ziemba | |
| 8,758,011 B2 | 6/2014 | Regere et al. | |
| 8,777,614 B2 | 7/2014 | Brennan et al. | |
| 8,936,465 B2 | 1/2015 | Helfenbein et al. | |
| 8,937,544 B2 | 1/2015 | Rigsby et al. | |
| 9,357,926 B2 | 6/2016 | Hollenbeck et al. | |
| 9,377,775 B2 | 6/2016 | Helfenbein et al. | |
| 9,504,536 B2 | 11/2016 | Bergheim et al. | |
| 9,551,995 B2 | 1/2017 | Feine et al. | |
| 9,592,101 B2 | 3/2017 | Bovet et al. | |
| 9,636,195 B2 | 5/2017 | Wolpo | |
| 9,730,765 B2 | 8/2017 | Mangelberger et al. | |
| 9,788,915 B2 | 10/2017 | Monty et al. | |
| 9,820,827 B2 | 11/2017 | Feine | |
| 9,956,056 B2 | 5/2018 | Lehtonen | |
| 10,011,050 B2 | 7/2018 | Kitching et al. | |
| 10,098,708 B2 | 10/2018 | Pond | |
| 10,653,399 B2 | 5/2020 | Pruckner et al. | |
| 10,849,714 B2 | 12/2020 | Lehtonen | |
| 10,881,490 B2 | 1/2021 | St. Louis et al. | |
| 2006/0142744 A1 | 6/2006 | Boutoussov | |
| 2008/0027997 A1 | 1/2008 | Monroe | |
| 2008/0076249 A1 | 3/2008 | Fujii et al. | |
| 2008/0106419 A1* | 5/2008 | Sakama | G06K 19/07749 340/572.7 |
| 2008/0221564 A1 | 9/2008 | Rouiller et al. | |
| 2009/0047624 A1 | 2/2009 | Tsai | |
| 2009/0148810 A1 | 6/2009 | Maxwell et al. | |
| 2010/0248177 A1* | 9/2010 | Mangelberger | A61C 1/12 307/104 |
| 2011/0039229 A1 | 2/2011 | Senia | |
| 2012/0206239 A1 | 8/2012 | Ikemoto | |
| 2013/0248598 A1 | 9/2013 | Dehnadi | |
| 2014/0212833 A1 | 7/2014 | Mangelberger et al. | |
| 2015/0084745 A1 | 3/2015 | Hertz et al. | |
| 2015/0150647 A1 | 6/2015 | Chevalier | |
| 2016/0262847 A1 | 9/2016 | Rickert et al. | |
| 2016/0331308 A1* | 11/2016 | Zhou | A61M 35/003 |
| 2016/0345917 A1 | 12/2016 | Daon et al. | |
| 2017/0340411 A1* | 11/2017 | Akselrod | A61C 5/50 |
| 2018/0028275 A1 | 2/2018 | Bradley et al. | |
| 2018/0092710 A1 | 4/2018 | Bosisio et al. | |
| 2018/0164221 A1* | 6/2018 | Singh | C12N 1/20 |
| 2018/0206946 A1 | 7/2018 | Vonwiller | |
| 2018/0256287 A1 | 9/2018 | Bosisio et al. | |
| 2018/0353261 A1 | 12/2018 | Mangelberger et al. | |
| 2019/0069980 A1 | 3/2019 | Kapec et al. | |
| 2019/0290383 A1 | 9/2019 | Yaginuma et al. | |
| 2021/0298872 A1* | 9/2021 | Pfleiderer | A61C 1/08 |

FOREIGN PATENT DOCUMENTS

| | | | |
|---|---|---|---|
| JP | 2005342403 A | | 12/2005 |
| JP | 2006269086 A | | 10/2006 |
| JP | 200878207 A | | 4/2008 |
| JP | 2008210032 A | | 9/2008 |
| JP | 2017113544 A | | 6/2017 |
| JP | 2019126535 A | * | 8/2019 |
| WO | 2007097385 A1 | | 8/2007 |
| WO | 2011118379 A1 | | 9/2011 |

OTHER PUBLICATIONS

Yamanaka, JP-2019126535-A, Dental Handpiece, Dental Handpiece Control System and Manufacturing Method of Dental Handpiece, Machine translation (Year: 2019).*

Int'l Search Report and Written Opinion issued Nov. 13, 2020 in Int'l Application No. PCT/2020/048753.

Extended Search Report issued Sep. 5, 2023 in European Application No. 20871726.4.

Office Action issued Mar. 13, 2023 in JP Application No. 2022-519993 including English Translation.

English Translation of Office Action issued Aug. 7, 2023 in JP Application No. 2022-519993.

English translation of Office Action issued Sep. 2, 2024 in JP Application No. 2023-206978.

* cited by examiner

DENTAL HANDPIECE WITH EMBEDDED WIRELESS COMMUNICATION DEVICE

CROSS-REFERENCE TO RELATED APPLICATIONS

This application is a Section 371 of International Application No. PCT/US2020/048753, filed Aug. 31, 2020, which was published on Apr. 4, 2021 under International Publication No. WO 2021/066978 A1, which claims priority under 35 U.S.C. § 119 to U.S. Provisional Patent Application No. 62/907,981, filed Sep. 30, 2019, entitled "Dental Handpiece with Embedded Wireless Communication Device," the entire contents of all of which are incorporated by reference herein.

BACKGROUND

Embodiments described herein relate generally to a dental handpiece, and more particularly, to a pneumatic dental handpiece with an embedded wireless communication device for tracking details of the handpiece, such as the usage, cleaning and/or maintenance history, and the like.

Dentists need an easy method for keeping track of handpieces, e.g., a way to determine whether a handpiece has been cleaned, lubricated, autoclaved, used in a dental procedure, or the like. This is particularly challenging when visually assessing a large supply of handpieces. Previous attempts were made to visually or electronically track handpieces using exterior color bands, or by attaching a bar code or the like to the handpiece for scanning and tracking. However, these methods were subject to wear as the handpiece was used, cleaned, and autoclaved. Colored bands or bar code labels would fade or detach from the handpiece.

It is desired to provide a more robust and reliable method of tracking a dental handpiece through its use and maintenance.

BRIEF SUMMARY

Briefly stated, one embodiment comprises a dental handpiece including a head portion supporting a turbine configured for receiving a removable dental tool for rotation therewith, and a handle portion having a first end, an opposing second end, and an internal cavity. The head portion is disposed at the first end of the handle portion and the second end of the handle portion is configured for removable connection to a supply hose. One or more conduits extend at least partially through the internal cavity of the handle portion toward the head portion. At least one of the one or more conduits is a drive fluid tube configured to deliver a drive fluid to the head portion for rotating the turbine. A wireless communication device is disposed within the internal cavity of the handle portion and is attached to at least one of the one or more conduits. At least a section of the handle portion surrounding the wireless communication device is formed of a dielectric material. The wireless communication device is configured to wirelessly communicate with a reader or writer external to the dental handpiece and is configured to store data related to at least one of identification, use, or maintenance of the dental handpiece. An electrically inert substrate material encapsulates the wireless communication device. The wireless communication device is electrically isolated from other components of the dental handpiece.

In one aspect, the handle portion is formed from a first housing encompassing the first end and a second housing encompassing the second end. The first and second housings together define the internal cavity.

In another aspect, the second housing contains the wireless communication device.

In yet another aspect, the second housing is formed of the dielectric material.

In still another aspect, the second housing attaches to the first housing using a threaded connection.

In another aspect, the handle portion extends from the second end in an initial direction that defines a handle axis.

In yet another aspect, the wireless communication device has a central, longitudinal axis that is oriented substantially perpendicularly with respect to the handle axis.

In another aspect, the one or more conduits includes a fiber-optic cable.

In yet another aspect, the wireless communication device is attached to the fiber-optic cable.

In another aspect, the at least one of the one or more conduits to which the wireless communication device is attached is made from metal.

In yet another aspect, the substrate material is made from one of silicone, a polymeric material, or a silicone-polymer composite.

In still another aspect, the dielectric material is polyether ether ketone.

In another aspect, the wireless communication device is configured to be powered by a signal from the external reader or writer.

In yet another aspect, the wireless communication device is an RFID chip.

In still another aspect, the data includes at least one of dates, times, or durations of at least one of use, cleaning, lubricating, or autoclaving of the dental handpiece.

In another aspect, the data includes a unique identifier of the dental handpiece.

Another embodiment comprises a dental handpiece including a handle portion formed from a first housing having a head portion at a first end thereof and a second end removably connected to a first end of a second housing. The second housing has a second end configured for connection to a supply hose. The first and second housings define an internal cavity. The second housing defines a longitudinally extending handle axis and is made from a dielectric material. The first housing includes a bend such that a portion of the first housing extends at an angle transverse to the handle axis. A turbine is supported in the head portion and is configured to removably receive a dental tool for rotation therewith. A manifold is disposed within the internal cavity and is contained in the second housing. The manifold includes a plurality of connection openings and is configured for receiving the supply hose. A compressed air tube connects to one of the connection openings of the manifold and extends through the internal cavity to the head portion. The compressed air tube is configured to supply compressed air to the head portion for rotating the turbine. A fiber-optic cable is connected to another of the connection openings of the manifold and extends through the internal cavity and terminates at a light opening in the head portion. The fiber-optic cable is made at least partially from metal. An RFID chip is contained in the second housing and attaches to the fiber-optic cable within the internal cavity. The RFID chip has a central, longitudinal axis that is oriented substantially perpendicularly with respect to the handle axis. The RFID chip is configured to wirelessly communicate with a reader or writer external to the dental handpiece and is configured to store data related to at least one of identification, use, or maintenance of the dental handpiece. An electrically inert substrate material encapsulates the RFID chip. The RFID chip is electrically isolated from other components of the dental handpiece.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Figure 1:
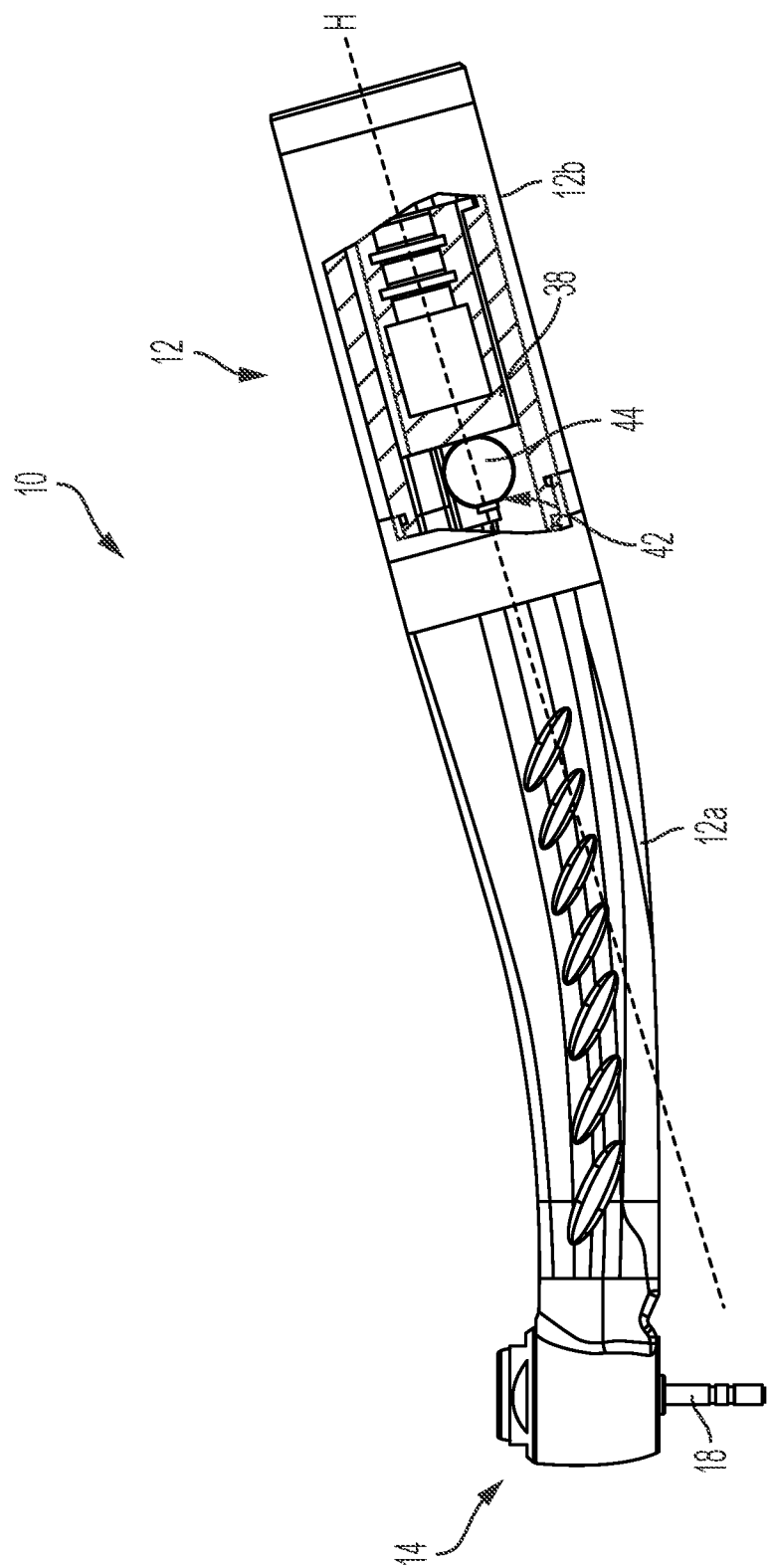
FIG. 1 is a left side elevational partial cut-away view of a dental handpiece according to a first preferred embodiment.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-4, there is shown a first preferred embodiment of a dental handpiece 10, which preferably includes a handle portion 12 and a head portion 14. The head portion 14 preferably supports a high-speed, air-driven turbine 16 to which a dental tool 18, such as a burr, drill bit, or the like, may be attached for rotation therewith. The dental tool 18 may be removable from the turbine 16 and head portion 14 for maintenance, replacement, or the like. At an end opposite the head portion 14, the handle portion 12 is preferably connected to a supply hose (not shown), which provides compressed air or a similar fluid for driving the turbine 16.

The handle portion 12 preferably is formed from a fore housing 12a with the head portion 14 located at a fore end thereof, and an opposite aft end removably connected to an aft housing 12b. The head portion 14 may be integrally formed with the fore housing 12a, or may be a separate component attached to the fore end of the fore housing 12a via threading, welding, or other like connecting methods. The aft end of the fore housing 12a preferably includes a thread 20 for coupling to a complementary thread 22 on the aft housing 12b. Both the fore and aft housings 12a, 12b define internal cavities for containing various components, as will be described more fully below. Preferably, the threaded connection of the fore and aft housings 12a, 12b is fluidly sealed, to prevent egress of contaminants into the cavities that may negatively affect various components.

The fore housing 12a preferably includes a drive fluid tube 24 that extends from the aft end of the fore housing 12a to the head portion 14 for introducing the drive fluid (e.g., compressed air) to the turbine 16. The fore housing 12a further includes a cooling air tube 26 and a cooling fluid tube 28 that extend from the aft end of the fore housing 12a. The cooling air and cooling fluid tubes 26, 28 preferably transport air and fluid (e.g., water) provided by the supply hose. The cooling air and cooling fluid tubes 26, 28 may merge into a cooling mist tube 30, which is shown in the drawings within the fore housing 12a. There, the air and fluid combine to form a mist, which is transported by the cooling mist tube 30 to the head portion 14, where the mist is emitted from one or more ports 32 toward the dental tool 18. The mist allows for cooling and/or cleaning of the dental tool 18 and/or the work site in the patient's mouth. In alternative embodiments, the cooling air and cooling fluid may be mixed prior to reaching the dental handpiece 10, such that only the cooling mist tube 30 is required. In other embodiments, only the cooling air tube 26 or the cooling fluid tube 28 may be required.

The fore housing 12a further preferably includes a fiber-optic cable 34 extending from the aft end of the fore housing 12a toward the head portion 14, terminating in a light opening 36 in the head portion 14. The fiber-optic cable 34 preferably directs light provided by the supply hose toward the dental tool 18 and work site through the light opening 36. In alternative embodiments, the fiber-optic cable 34 may optically couple to a lamp (not shown), such as an LED, that is mounted within the fore or aft housing 12a, 12b, which may receive power from the supply hose or from a power source within the dental handpiece 10. In still other embodiments, the fiber-optic cable 34 may be omitted altogether and there may be a lamp (e.g., and LED) mounted at or near the head portion 14 that receives power from the supply hose and a power cable (not shown) running through the fore and aft housings 12a, 12b.

A manifold 38 is preferably disposed within the aft housing 12b to couple the drive fluid, cooling air, and cooling fluid tubes 24, 26, 28 and the fiber-optic cable 34 to corresponding supply lines (not shown) from the supply hose. The manifold 38 preferably is formed as a solid body with a plurality of connection openings 40 formed therethrough for receiving respective ones of the drive fluid, cooling air, and cooling fluid tubes 24, 26, 28 and the fiber-optic cable 34 at a fore end thereof, as well as respective supply lines from the supply hose at an aft end thereof. The drive fluid, cooling air, and cooling fluid tubes 24, 26, 28 and the fiber-optic cable 34 preferably couple to the respective connection openings via an interference fit, although other types of like connections can be made as well. In the embodiment shown in FIGS. 1-4, the drive fluid, cooling air, and cooling fluid tubes 24, 26, 28 and the fiber-optic cable 34 preferably extend beyond the aft end of the fore housing 12a for ease of connection with the manifold 38, but the manifold 38 could just as easily extend into the fore housing 12a to make the appropriate connections.

By connecting to the various tubes and cables from the fore housing 12a, the manifold 38 is preferably kept from rotating with the aft housing 12b, allowing the aft housing 12b to be screwed onto the fore housing 12a without disrupting the necessary fluid and cable connections.

The aft housing 12b preferably defines a longitudinally extending handle axis H. For ease of use within the patient's mouth, the fore housing 12a may include a bend such that a portion of the fore housing 12a preferably extends at an angle transverse to the handle axis H, placing the head portion 14, and the dental tool 18 off-center with respect to the handle axis H. However, in some embodiments, the bend may occur in the aft housing 12b.

The aft housing 12b preferably contains a wireless communication device 42, preferably in the form of a radio frequency identification (RFID) chip, containing at least an antenna and a memory (not shown). The memory preferably stores information related to use and/or maintenance of the dental handpiece 10, for example, dates, times, and/or durations of use, cleaning, lubricating, autoclaving, and the like. In simpler embodiments, the memory may simply store a binary indicator regarding whether the dental handpiece 10 has been used, cleaned, lubricated, autoclaved, and/or the like. Additional information may also be stored, such as a unique identifier of the dental handpiece 10, a manufacturing date, the number of times of use, cleaning, or the like, whether the dental tool 18 has been replaced, and other like information useful to the operator for tracking or determining a condition of the dental handpiece 10. It is preferred that the data be encrypted to prevent illicit reading or writing functions in connection with the wireless communication device 42.

The stored data may be written to the wireless communication device 42 by one or more external writers. For example, an external writer may be present at various dedicated locations, e.g., an external writer may be associated with an autoclave, another external writer may reside near a dental chair to register use, another external writer may be located near a lubrication station, and the like. Alternatively, for example, a single external writer may be used to write all data to the wireless communication device 42. Similarly, reading and writing functions may be combined within a single external device or spread out among different external devices at various locations.

While the wireless communication device 42 in the preferred embodiment is an RFID chip, other types of wireless communication devices can be used as well, such as near-field communication (NFC) chips, a BLUETOOTH low energy (BLE) chip, or the like. Moreover, it is preferred that the wireless communication device 42 be powered solely by an interrogation or other signal from an external reader and/or writer (not shown), although a separate local power supply (not shown) can be provided within the dental handpiece 10 for the wireless communication device 42, or power can be provided externally from the supply hose.

It is further preferred that the wireless communication device 42 be electrically isolated from other components in the dental handpiece 10. That is, the wireless communication device 42 preferably has no physical connection or contact with any other electrical, electronic, or energy-emitting component or device of the dental handpiece 10. The wireless communication device 42 is further shown in FIGS. 1-4 to be encapsulated in a substrate material 44 that may be made from silicone, a polymeric material, a silicone-polymer composite, or a like electrically inert material that allows wireless signals to pass substantially unimpeded from and to the wireless communication device 42.

Figure 2:
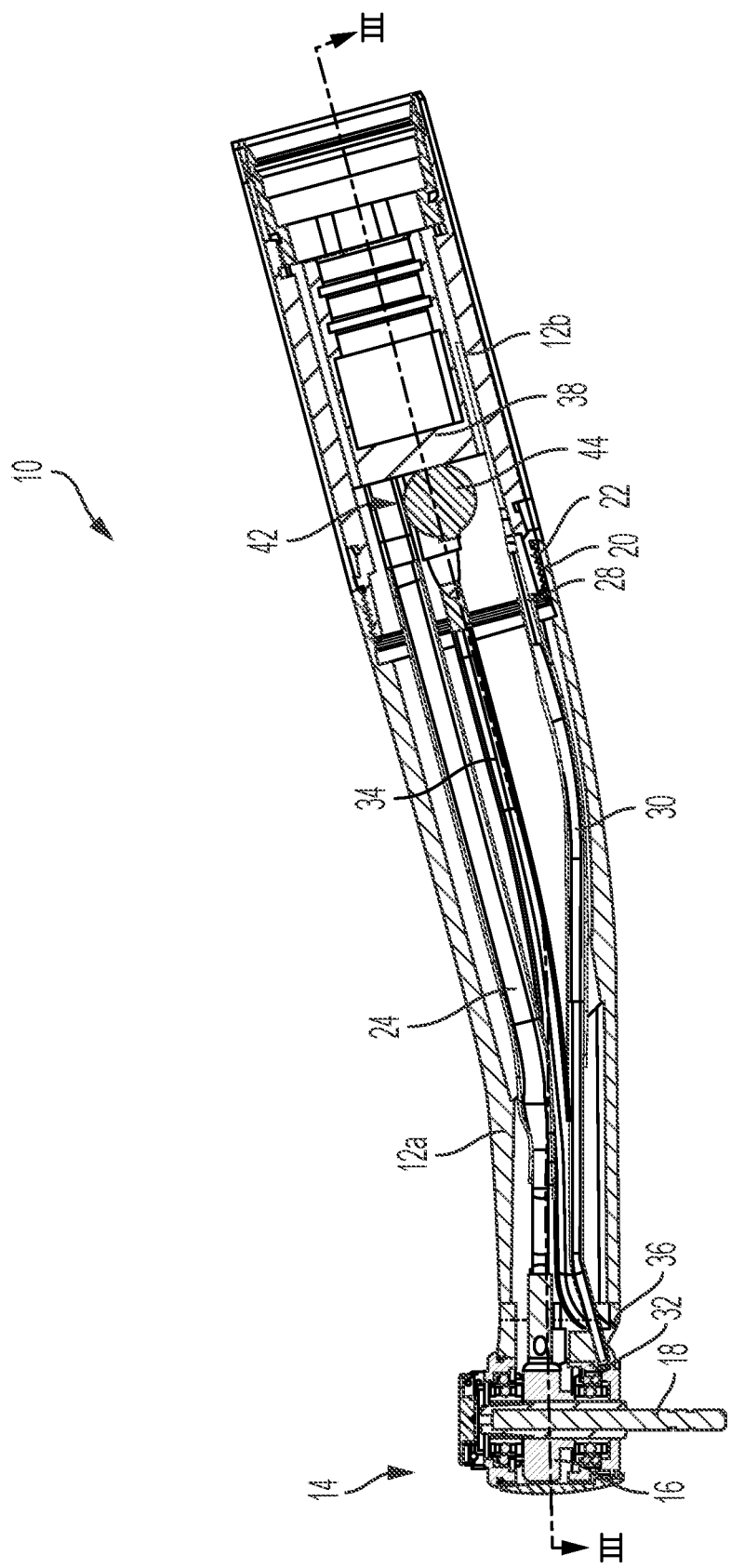
FIG. 2 is a left side elevational cross-sectional view of the dental handpiece of FIG. 1.
Figure 3:
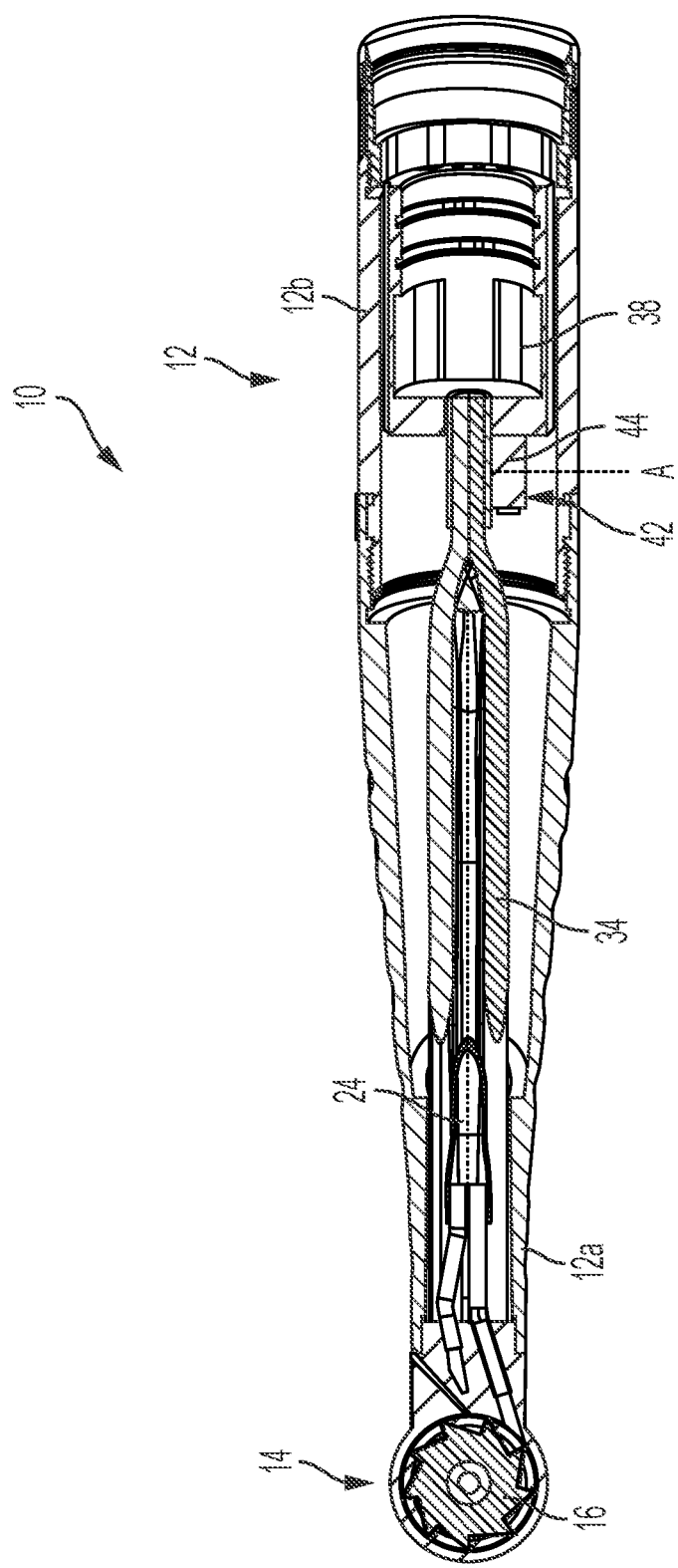
FIG. 3 is a top plan cross-sectional view of the dental handpiece of FIG. 1, taken along the line in FIG. 2.
Figure 4:
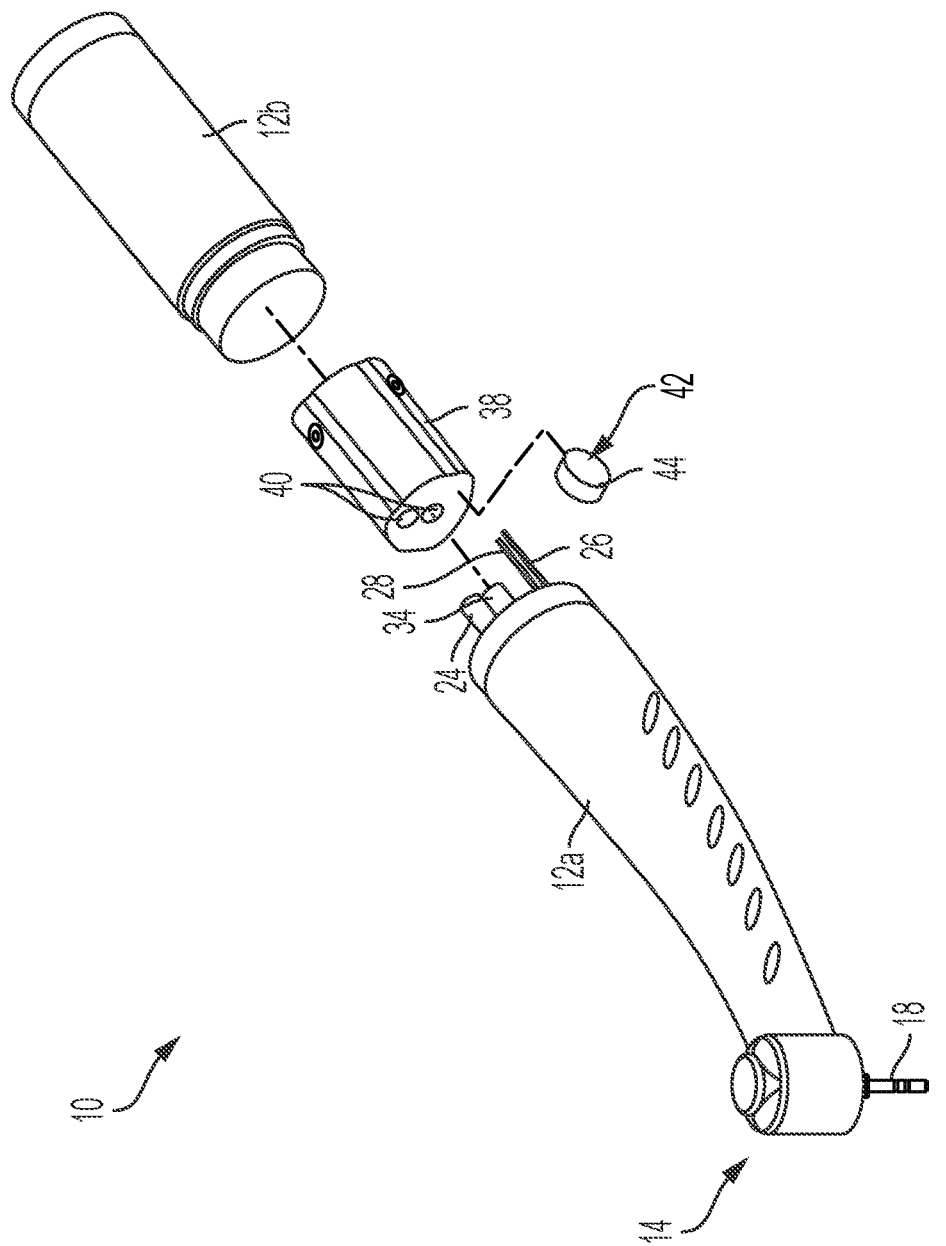
FIG. 4 is a top left perspective partial exploded view of the dental handpiece of FIG. 1.

The substrate material 44 may also serve as a bonding agent to secure the wireless communication device 42 to another component of the dental handpiece 10. In FIGS. 1 and 2, the wireless communication device 42 is shown attached to the fiber-optic cable 34 within the aft housing 12b. In alternative embodiments, the wireless communication device 42 may be attached to one or more other components, such as the drive fluid tube 24, the cooling air or cooling fluid tubes 26, 28, the cooling mist tube 30, the manifold 38, or the like. However, it is preferred that the one or more components to which the wireless communication device 42 is attached be of a construction so as to provide constructive interference to signals being sent and/or received by the wireless communication device 42. For example, the fiber-optic cable 34 or one of the tubes 24, 26, 28, 30 may be made at least partially from metal or other like material capable of reflecting the wireless signal. In this way, for example, components such as the fiber-optic cable 34 may enable an improved wireless signal accessible by the external reader or writer since the signals transmitted by the wireless communication device 42 are not emanated in multiple different directions, but are better focused. In still other embodiments, the wireless communication device 42 can be attached to an interior wall of the aft housing 12b or the fore housing 12a.

Conventional dental handpieces are primarily made from a metal material (e.g., stainless steel or the like), which is not conducive to the transmission of wireless signals. To accommodate the wireless communication device 42, the aft housing 12b, or at least portions thereof surrounding the wireless communication device 42, are preferably made from a dielectric material, for example polyether ether ketone (PEEK) or the like, which allows for transmission and/or emissions of wireless signal energy. The fore housing 12a may nonetheless continue to be made from a more conventional material, unless the wireless communication device 42 is housed or partially housed therein, in which case at least a portion of the fore housing 12a should be made from a dielectric material.

With the wireless communication device 42 embedded within the dental handpiece 10 and within the substrate material 44, it is suitably protected during use, cleaning, autoclaving, and like processes performed on the dental handpiece 10. The threaded connection of the fore and aft housings 12a, 12b further permits access to the wireless communication device 42 for removal and/or replacement, as necessary.

It is further preferred that the wireless communication device 42 be mounted such that a central, longitudinal axis A (FIG. 3) thereof is oriented substantially perpendicularly with respect to handle axis H. Such an orientation may enhance the wireless signal propagation in convenient directions, thereby making reading and writing operations easier.

While the dental handpiece 10 shown and described herein is shown to be a pneumatic handpiece, other types of handpieces, as are conventionally known, may also be used within the scope of the present invention.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A dental handpiece comprising:
a head portion supporting a turbine configured for receiving a removable dental tool for rotation therewith;
a handle portion having a first end, an opposing second end, and an internal cavity, the head portion being disposed at the first end of the handle portion and the second end of the handle portion being configured for removable connection to a supply hose;
one or more conduits extending at least partially through the internal cavity of the handle portion toward the head portion, at least one of the one or more conduits being a drive fluid tube configured to deliver a drive fluid to the head portion for rotating the turbine;
a wireless communication device disposed within the internal cavity of the handle portion and attached to at least one of the one or more conduits, at least a section of the handle portion surrounding the wireless communication device being formed of a dielectric material, the wireless communication device being configured to wirelessly communicate with a reader or writer external to the dental handpiece and configured to store data related to at least one of identification, use, or maintenance of the dental handpiece; and
an electrically inert substrate material encapsulating the wireless communication device, the wireless communication device being electrically isolated from other components of the dental handpiece.

2. The dental handpiece of claim 1, wherein the handle portion is formed from a first housing encompassing the first end and a second housing encompassing the second end, the first and second housings together defining the internal cavity.

3. The dental handpiece of claim 2, wherein the second housing contains the wireless communication device.

4. The dental handpiece of claim 3, wherein the second housing is formed of the dielectric material.

5. The dental handpiece of claim 2, wherein the second housing attaches to the first housing using a threaded connection.

6. The dental handpiece of claim 1, wherein the handle portion extends from the second end in an initial direction that defines a handle axis.

7. The dental handpiece of claim 6, wherein the wireless communication device has a central, longitudinal axis that is oriented substantially perpendicularly with respect to the handle axis.

8. The dental handpiece of claim 1, wherein the one or more conduits includes a fiber-optic cable.

9. The dental handpiece of claim 8, wherein the wireless communication device is attached to the fiber-optic cable.

10. The dental handpiece of claim 1, wherein the at least one of the one or more conduits to which the wireless communication device is attached is made from metal.

11. The dental handpiece of claim 1, wherein the substrate material is made from one of silicone, a polymeric material, or a silicone-polymer composite.

12. The dental handpiece of claim 1, wherein the dielectric material is polyether ether ketone.

13. The dental handpiece of claim 1, wherein the wireless communication device is configured to be powered by a signal from the external reader or writer.

14. The dental handpiece of claim 1, wherein the wireless communication device is an RFID chip.

15. The dental handpiece of claim 1, wherein the data includes at least one of dates, times, or durations of at least one of use, cleaning, lubricating, or autoclaving of the dental handpiece.

16. The dental handpiece of claim 1, wherein the data includes a unique identifier of the dental handpiece.

17. A dental handpiece comprising:
a handle portion formed from a first housing having a head portion at a first end thereof and a second end removably connected to a first end of a second housing, the second housing having a second end configured for connection to a supply hose, the first and second housings defining an internal cavity, the second housing defining a longitudinally extending handle axis and being made from a dielectric material, the first housing including a bend such that a portion of the first housing extends at an angle transverse to the handle axis;
a turbine supported in the head portion and configured to removably receive a dental tool for rotation therewith;
a manifold disposed within the internal cavity and contained in the second housing, the manifold including a plurality of connection openings and being configured for receiving the supply hose;
a compressed air tube connected to one of the connection openings of the manifold and extending through the internal cavity to the head portion, the compressed air tube being configured to supply compressed air to the head portion for rotating the turbine;
a fiber-optic cable connected to another of the connection openings of the manifold and extending through the internal cavity and terminating at a light opening in the head portion, the fiber-optic cable being made at least partially from metal;
an RFID chip contained in the second housing and attached to the fiber-optic cable within the internal cavity, the RFID chip having a central, longitudinal axis that is oriented substantially perpendicularly with respect to the handle axis, the RFID chip being configured to wirelessly communicate with a reader or writer external to the dental handpiece and configured to store data related to at least one of identification, use, or maintenance of the dental handpiece; and
an electrically inert substrate material encapsulating the RFID chip, the RFID chip being electrically isolated from other components of the dental handpiece.

* * * * *